(12) United States Patent
Skull

(10) Patent No.: US 7,330,869 B2
(45) Date of Patent: Feb. 12, 2008

(54) HYBRID ARITHMETIC LOGIC UNIT

(75) Inventor: Jon Skull, Epsom (GB)

(73) Assignee: Micron Technology, Inc., Boise, ID (US)

( * ) Notice: Subject to any disclaimer, the term of this patent is extended or adjusted under 35 U.S.C. 154(b) by 696 days.

(21) Appl. No.: 10/406,046

(22) Filed: Apr. 1, 2003

(65) Prior Publication Data

US 2004/0111455 A1  Jun. 10, 2004

(51) Int. Cl.
*G06F 7/50* (2006.01)
*G06F 7/52* (2006.01)

(52) U.S. Cl. .................................. 708/708; 708/714

(58) Field of Classification Search ............... 708/708, 708/629
See application file for complete search history.

(56) References Cited

U.S. PATENT DOCUMENTS

| | | | | |
|---|---|---|---|---|
| 3,100,835 | A * | 8/1963 | Bedrij ........................ | 708/714 |
| 3,340,388 | A * | 9/1967 | Earle ........................ | 708/700 |
| 3,515,344 | A * | 6/1970 | Powers et al. ............. | 708/708 |
| 3,553,446 | A * | 1/1971 | Kruy ......................... | 708/714 |
| 4,110,832 | A * | 8/1978 | Leininger et al. .......... | 708/708 |
| 4,727,507 | A * | 2/1988 | Miyanaga .................. | 708/629 |
| 4,769,780 | A * | 9/1988 | Chang ....................... | 708/629 |
| 4,811,269 | A |   3/1989 | Hirose et al. .............. | 364/754 |
| 4,819,198 | A |   4/1989 | Noll et al. | |
| 5,751,619 | A * | 5/1998 | Agarwal et al. ........... | 708/523 |
| 6,167,421 | A |  12/2000 | Meeker et al. ............. | 708/626 |
| 6,615,228 | B1 |  9/2003 | Colon-Bonet et al. ..... | 708/497 |

FOREIGN PATENT DOCUMENTS

| | | |
|---|---|---|
| CA | 2 330 169 A1 | 6/2001 |
| FR | 2809835 A1 | 12/2001 |
| GB | 1549968 | 8/1979 |
| GB | 2185338 A | 7/1987 |
| WO | WO 01/27742 A1 | 4/2001 |

\* cited by examiner

*Primary Examiner*—Tan V. Mai
(74) *Attorney, Agent, or Firm*—Ropes & Gray LLP

(57) ABSTRACT

Methods and apparatus for improving the efficiency of an arithmetic logic unit (ALU) are provided. The ALU of the invention combines the operation of a single-cycle ALU with the processing speed of a pipelined ALU. Arithmetic operations are performed in two stages: a first stage that produces separate sum and carry results in a first cycle, and a second stage that produces a final result in one or more immediately subsequent cycles. While this produces final results in two or more clock cycles, useable partial results are produced each cycle, thus maintaining a one operation per clock cycle throughput.

25 Claims, 4 Drawing Sheets

HYBRID ARITHMETIC LOGIC UNIT

BACKGROUND OF THE INVENTION

This invention relates to arithmetic logic units for use in computer processors. More particularly, this invention relates to pipelined arithmetic logic units that improve the performance of such processors.

An arithmetic logic unit (hereinafter "ALU") is one of the fundamental building blocks of a processor (e.g., for use in a computer or other electronic device). The ALU is a combinatorial circuit that performs a set of basic arithmetic and logic operations. These operations can be performed on one or more binary words received by the ALU. Binary words, also referred to as n-bit words, are strings of zeros and ones (e.g., "010011"). The ALU may add or subtract one binary word to or from another binary word to obtain a result. The ALU may also subject one or more binary words to AND, OR, XOR (i.e., exclusive-OR), and NOT logic operations.

Arithmetic operations are performed by an arithmetic circuit in the ALU. Typically, the arithmetic circuit includes an adder, which can be constructed, for example, from a number of full-adder circuits connected in cascade. The operations performed by the adder can be selected by controlling the adder's inputs. For example, if the ALU operates on one or more control signals, those signals can instruct the arithmetic circuit to perform a specified operation (e.g., subtract, addition, increment, or decrement).

Note that ALUs can also include multiplier circuitry for executing arithmetic operations such as, for example, multiplication and division. However, operations executed by multiplier circuitry generally require more time to complete than operations executed by adder circuitry. Thus, multiplier circuitry can limit an ALU's performance.

Logic operations are performed by a logic circuit in the ALU. The logic circuit typically performs the above-mentioned AND, OR, XOR, and NOT operations by performing individual bit-to-bit (i.e., bit wise) operations. That is, a respective bit (e.g., the least significant bit) of each n-bit word is subjected to the desired logic operation to provide a single word result. If the logic circuit performs AND, OR, XOR, and NOT operations, other known logic operations such as NAND (i.e., not AND), NOR (i.e., not OR), and XNOR (i.e., exclusive not OR) can also be performed by the logic circuit. Logic operations performed by the logic circuit can be based on one or more control signals. Note that these control signals can be common to both the logic and arithmetic circuits.

In conventional processors, the speed at which operations are performed by the ALU is often limited by the arithmetic circuit. Particularly, in single-cycle execution processors, the speed of the processor is limited by the adder circuitry of the arithmetic circuit. In a single clock cycle ALU, the ALU can generate results and flags useable in the immediately following clock cycle, thus achieving a one operation per clock cycle throughput.

The performance of single-cycle ALUs is generally not limited by the logic circuit because logic operations execute quickly, at least with respect to arithmetic operations. The logic circuit generally has a logic depth of just one gate (e.g., an AND gate) that data signals need to traverse in order to perform the desired operation. The arithmetic circuit, however, often has a depth greater than that of the logic circuit. Therefore, the more complex adder data paths often limit ALU performance.

To compensate for the delay caused by the adder, ALU operations can be pipelined. Pipelining increases the speed of the processor and can be accomplished, for example, by inserting one or more registers in the adder data paths. The addition of a register improves the processing speed of the ALU by shortening the cycle time (less time is required for data to reach the inserted registers(s)). However, arithmetic operations now require two or more clock cycles to complete. Even though pipelining causes some operations to require more than one clock cycle, operations can still be processed quicker than their single-cycle ALU counterpart. The concept behind pipelining is analogous to an assembly line process. In an assembly line process, construction of, for example, a large article of manufacture is performed by assembling in parallel subassemblies of the finished article. The article is built relatively quickly because the subassemblies are constructed separately and substantially, or at least partially, simultaneously before being combined to produce the finished article. Similarly, in pipelined arithmetic operations, various components of the final result are computed in a similar manner and are combined at the end of the arithmetic operation.

However, because more than one clock cycle is required to complete arithmetic operations, a mechanism is ordinarily required to prevent erroneous use of incomplete or incorrect ALU results in a subsequent operation. One such mechanism is a hardware interlock that inserts "dead" execution cycles. These dead execution cycles ensure that operations are completed before their results are used for subsequent operations in the ALU or processor (e.g., they allow data to propagate to an appropriate location). Similarly, dead execution cycles can be inserted by software. For example, a software compiler can insert dead execution cycles appropriately as needed.

While dead execution cycles ensure proper operation of a pipelined ALU, they reduce the performance of the processor by limiting the processing of data during each clock cycle. For example, the pipelined ALU can generate a partial result of an operation relatively quickly, but before that partial result can be used in a subsequent operation, the ALU may have to wait while dead execution cycles pass. Thus, during dead execution cycles, the pipelined ALU is idling and not executing any subsequent operations.

In view of the foregoing, it would be desirable to provide an ALU with improved efficiency that reduces, if not eliminates, the need to intentionally stall operations.

SUMMARY OF THE INVENTION

It is an object of this invention to provide an ALU with improved efficiency that reduces, if not eliminates, the need to intentionally stall operations.

In accordance with this invention, a hybrid ALU is provided that combines the error-free operation of a single-cycle ALU with the high speed operation of a pipelined ALU. This combination provides a high speed ALU that generates a final result over two clock cycles while maintaining a one operation per clock cycle throughput.

The invention uses a combination of a carry-save adder and feedback circuitry to execute a portion of an arithmetic operation each clock cycle. The invention also uses an adder to complete the arithmetic operation initiated in the carry-save adder. Although the adder requires at least one additional clock cycle in order to complete the operation initiated in the carry-save adder, the overall efficiency of the ALU is improved.

The hybrid ALU of the invention has two basic parts: (1) a carry-save adder, feedback circuitry, and partial/conditional sum adder and (2) an adder. The two parts operate in conjunction with each other to produce a final result within two clock cycles (but not before completion of a first cycle). The first part (carry-save adder, feedback circuitry, and partial/conditional sum adder) generates a partial sum result and a partial carry result based on the inputs provided to the carry-save adder. The partial sum result represents the bitwise summation of the inputs without including any carries. The partial carry result represents any carries generated as a result of the bitwise summation. The partial carry and sum results are calculated within one clock cycle because there is no need to propagate carries. Moreover, the combination of the partial sum and carry results represents the sum total of the inputs provided to the carry-save adder. The adder generates a final result (for that particular arithmetic operation) by adding the sum and carry results, including any carries, during at least one or more additional clock cycles. Note that the final result can be, for example, used in other operations or output to a peripheral device coupled to the ALU, etc.

The advantage of these sum and carry partial results is that they are generated quickly (within one clock cycle) and can be fed back into the carry-save adder via the feedback circuitry in the next clock cycle for use in a subsequent arithmetic operation. Thus, during the next clock cycle, the carry-save adder can generate a new partial sum and carry result based on the previous partial sum and carry results and a third input. The third input is typically a new operand or n-bit word received by the carry-save adder.

The partial/conditional sum adder performs a partial summation of the partial sum and carry results. More particularly, two partial results are generated, one that incorporates a carry-in of binary one and the other that incorporates a carry-in of binary zero. One of these two partial results is then selected based on a signal provided to the first part of the hybrid ALU indicating an actual carry-in of binary one or zero. The selected partial result is then provided to the second part of the hybrid ALU to finalize the operation begun in the first part of the hybrid ALU.

Accordingly, the first part of the hybrid ALU is responsible for maintaining single-cycle operation even though an arithmetic operation is not actually completed until a subsequent clock cycle (e.g., the next clock cycle).

The second part of the hybrid ALU (the adder) completes the arithmetic operation initiated in the first part. More particularly, the adder sums the partial sum and carry results generated by the first part of the ALU to obtain a final result. In performing this summation, the adder propagates the carries—which can be a time consuming operation. For this reason, the calculation of the final result requires one additional clock cycle. By spreading the arithmetic operation over preferably at most two clock cycles, sufficient time is provided for the carries to propagate.

Another advantage of the invention is that several instructions can be executed in sequence by the hybrid ALU. This is accomplished by routing the partial carry result back to the carry-save adder by way of the feedback circuitry. Because the first part of the hybrid ALU can generate partial sum and carry results each clock cycle, the final result of any sequence of instructions is obtained one clock cycle after the final inputs of the sequence are provided to the carry-save adder. For example, if ten instructions are executed in sequence, the end result of that sequence can be obtained in the eleventh clock cycle.

Advantageously, a carry-in bit can be stored in the least significant bit position of the partial carry result or in the feedback circuitry which stores the partial carry result. A carry-in bit can be stored in the least significant bit position because the carry result is shifted one bit to the left prior to use in a subsequent operation. The carry result is shifted to the left one bit because it is one order of magnitude higher than the sum result. The carry result is higher in magnitude because carries carry over to the next bit. Thus, after the carry result is shifted to the left, the least significant bit position is empty and available for storing a carry-in bit.

This carry-in bit may be provided, for example, when the final result generated in the second part of the ALU generates a carry that is to be used in a subsequent operation. The carry may be used in a subsequent operation, for example, when the ALU performs multiple word arithmetic. As defined herein, multiple word arithmetic is arithmetic involving n-bit words having more bits than the ALU can process in any given operation. For example, if an ALU is implemented in a 32-bit processor, then that ALU would perform multiple word arithmetic when adding two 64-bit words together. Inclusion of the carry-in bit provides the means for enabling the ALU to execute multiple word arithmetic.

Another advantage of the invention is that multiple word arithmetic can be performed while maintaining a one operation per clock cycle throughput. This advantage is realized by applying a carry-out generated in a previous clock cycle as a carry-in for an operation in the current clock cycle. If, for example, the second part of the hybrid ALU generated a carry-out in the previous cycle, this carry-out can be provided as a carry-in to the first part of the hybrid ALU during the current clock cycle. This carry-in is provided to the feedback circuitry and is used to select which partial result (generated by the partial/condition sum adder) is to be provided to the second part of the ALU.

In many instances, a carry-out generated in a previous clock cycle cannot be used by the carry-save adder prior to generating the partial sum and carry results for that particular clock cycle. Thus, the carry-in is provided to the feedback circuitry to put the stored partial sum and carry results in a condition that they would have been in had the carry-out from the previous cycle been provided to the carry-save adder prior to generating the partial sum and carry results. Thus, by providing the carry-in to the feedback circuitry, the stored partial sum and carry results fed back to the carry-save adder are representative of the actual result that will be obtained in the second part of the hybrid ALU.

As stated, the partial/conditional sum adder generates two partial results, one of which is selected based on the carry-in. An advantage of the partial/conditional sum adder is that the decision to select one of the two partial results need not be made until near the end of the clock cycle. Delaying this decision until near the end of the first cycle enables the first part of the hybrid ALU to incorporate a carry-out generated in a previous clock cycle without departing from the one operation per cycle throughout.

Note that the carry-in signal provided to the feedback circuitry and used to select a particular partial result can be provided from other than the carry-out of the second part of the hybrid ALU. For example, the carry-in signal can be provided from storage, in which case it represents a flag condition set by a previous arithmetic operation.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
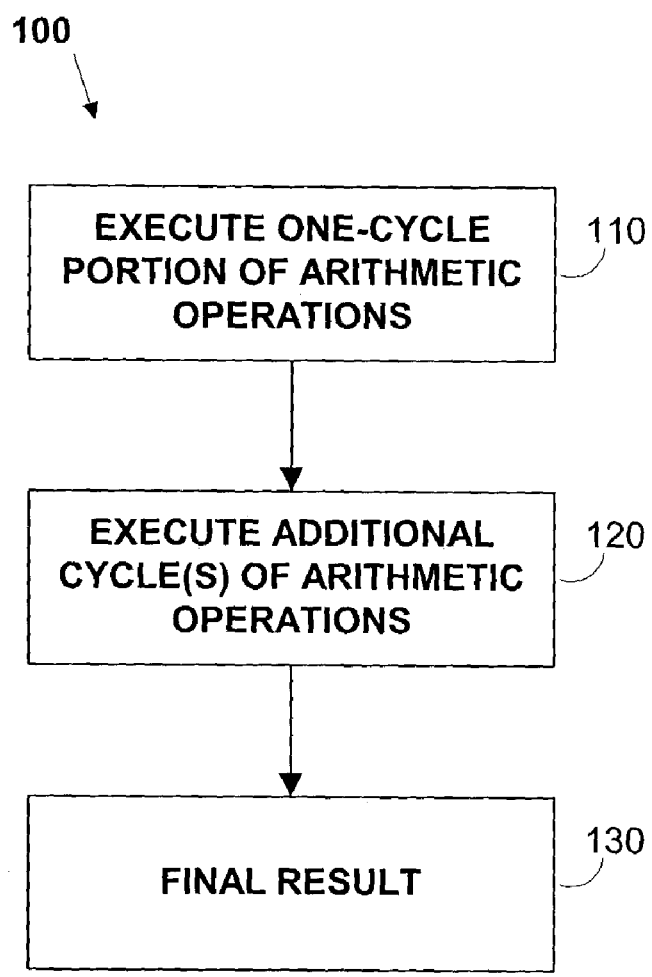
FIG. 1 is a flow chart illustrating the two functional parts of ALU circuitry in accordance with the invention.

FIG. 1 is a simplified flow chart 100 of arithmetic operations performed by a hybrid ALU in accordance with the invention. Each arithmetic operation is completed in preferably two clock cycles, while the ALU maintains a one operation per clock cycle throughput. A one operation per clock cycle throughput is maintained by dividing the execution of the arithmetic operation into two stages, execute 110 and execute 120. Execute 110 represents the portion of an arithmetic operation executed in one clock cycle, whereas execute 120 represents the portion of that arithmetic operation that requires an additional cycle (or cycles) to complete.

As defined herein, arithmetic operations include any typical bit-level operations such as, for example, increment, decrement, addition, subtraction, multiplication, division, etc. Logic operations (e.g., AND, OR, NOR, NAND, NOT, XOR, and XNOR) can also be performed by the hybrid ALU of this invention (however, logic operations are not the focus of this invention). For clarity, most of the operations discussed herein are addition operations.

Even though flow chart 100 shows that two clock cycles are needed to complete an arithmetic operation, the hybrid ALU need not execute dead cycles in order to do so. Dead cycles are used in known ALU's to prevent the arithmetic circuit from using incorrect data in successive operations, thus operation of the arithmetic circuit is intentionally stalled and performance degraded. The hybrid ALU, however, preferably executes a portion of an arithmetic operation each clock cycle, while producing a final result for that arithmetic operation over multiple clock cycles (e.g., two clock cycles). That is, the hybrid ALU makes full use of each clock cycle through parallel processing without having to wait for an arithmetic operation to complete before beginning a next operation.

For example, in a first clock cycle, the hybrid ALU quickly generates a partial result based on the received inputs. In an immediately subsequent clock cycle, the hybrid ALU completes the arithmetic operation based on the inputs received in the first clock cycle to produce a final result. Advantageously, the hybrid ALU need not wait for the final result to be generated in that immediately subsequent clock cycle in order to continue processing new received inputs. The hybrid ALU maintains a one operation per cycle throughput by feeding back the partial results (generated in the first clock cycle) for use as inputs in the second clock cycle to produce new partial results, the final result of which can be completed in, for example, a third clock cycle.

Execute 110 operations are executed in one clock cycle. Circuitry that executes operations within one clock cycle include, for example, a carry-save adder (hereinafter "CSA"). The CSA performs a bitwise summation of two operand bits and an optional carry bit. In practice, the CSA performs a bitwise summation of two operands, one of which includes the carry bit. For purposes of this description, the carry bit is referred to as the carry input even though it is part of one of the operands. The operand bits are part of an n-bit number or word received by the CSA. The carry bit is part of one of those n-bit operands received by the CSA, but is referred to as a third input for purposes of this description. The carry input can represent carries from operations performed in a previous clock cycle. The CSA does not perform addition in the traditional sense in that a binary sum of two binary numbers is not produced. That is, the CSA does not propagate or include carries when adding the operand and carry bits together.

Because the CSA does not propagate or include carries, it can generate results for each bit position independent of the other bit positions. These independent calculations can be executed during one clock cycle and thus allow the hybrid ALU to maintain single-cycle throughput even though multiple cycles are required to fully complete an operation. The following example illustrates carry-save addition performed by the CSA. Inputs 1, 2, and 3 represent operand A, operand B, and a carry, respectively.

$$1010 \quad opA \tag{1}$$

$$1111 \quad opB \tag{2}$$

$$\underline{+\quad 1} \quad carry \tag{3}$$

The CSA generates two n-bit partial results, a sum and a carry. The result represents the bitwise summation of each bit and is shown below.

$$0100 \tag{4}$$

The carry result represents carries produced in each bitwise summation and is shown below.

$$1011 \tag{5}$$

Although the carry result has the same number of bits as the sum result, it is one order of magnitude higher than the sum result. The carry result has a higher order of magnitude because carries are used in (propagated to) the next bit position. Thus, the carry result is actually the five bit result "10110."

Note that the sum and carry results are partly responsible for enabling CSA to continually process operations without waiting for each operation's completion (e.g., generation of a particular final result). Feedback circuitry routes the partial carry and sum results back to the CSA for use in the next clock cycle, which provides the CSA with two of its three inputs (i.e., providing the CSA with one operand that includes the carry). As will be described in more detail below, the partial sum and carry results embody the final result of the arithmetic operation, and thus can be used in immediately subsequent operations. A next input can be used in conjunction with the fed-back partial sum and carry results to produce new partial carry and sum results. Thus, the combination of CSA and feedback circuitry allows the ALU to continually process at least a portion of an arithmetic operation each clock cycle without having to wait for completion of a final stage of an arithmetic operation.

The summation of the sum result and the carry result produces in final form the final summation result of operand A, operand B, and the carry. The partial sum and carry results represent the final result, but in a non-final form. The summation below of the sum and carry results produces the final result.

$$
\begin{array}{rl}
0100 & \text{Sum} \\
+\,10110 & \text{Carry} \\
\hline
11010 & \text{Final Result}
\end{array}
\quad (6)
$$

This computation is carried out in execute 120 because the propagation of the carries requires a second clock cycle (which immediately follows the first clock cycle in execute 110).

The separate sum and carry results can be stored in a respective sum register and carry register (e.g., in the feedback circuitry). Note that because the carry result is shifted one bit to the left, the least significant bit position is zero. Thus, if desired, a bit can be stored in that least significant bit position. This carry mechanism allows longer word length arithmetic to be performed over multiple clock cycles. Note that if a carry-in is stored in the least significant bit of the carry register, that bit is part of one the operands received by the CSA.

Execute 110 also includes a partial/conditional sum adder, which generates two partial results: one based on the assumption that the carry-in is binary zero and the other based on the assumption that the actual carry-in is binary one. One of these partial results is selected based on the actual carry-in. Thus, if the actual carry-in is binary one, the partial result based on the assumption that the carry-in is binary one is selected and provided to execute 120. Likewise, if the carry-in is binary zero, the partial result is based on the assumption provided to execute 120.

The partial/conditional sum adder provides a delayed carry mechanism executed near the end of the execute 110 clock cycle. This is advantageous because it enables execute 110 to incorporate a carry-out generated in a previous clock cycle into the current clock cycle (as a carry-in) without departing from the one operation per cycle throughput.

A carry-in provided to execute 110 is also stored in the feedback circuitry. This preserves the accuracy of the partial sum and carry results for subsequent operations. For example, if the carry-in selects the partial result based on the assumption that the carry-in is binary one, then the result provided to execute 120 includes the carry-in. However, the partial sum and carry results generated by the CSA do not include the carry-in. Therefore, the carry-in is provided to the feedback circuitry to put the sum and carry results in a position they would been in had the carry-in been provided by the CSA.

Operations (e.g., addition of the sum and carry results generated by the CSA) that require an additional clock cycle to complete are performed at execute 120 by a completion adder and other circuitry. An extra clock cycle is needed after generation of the sum and carry results because propagation of the carries generally cannot be completed within that first clock cycle.

A final result 130 is available (e.g., for storage in memory) after execute 110 initiates an arithmetic operation and execute 120 completes that operation.

Figure 2:
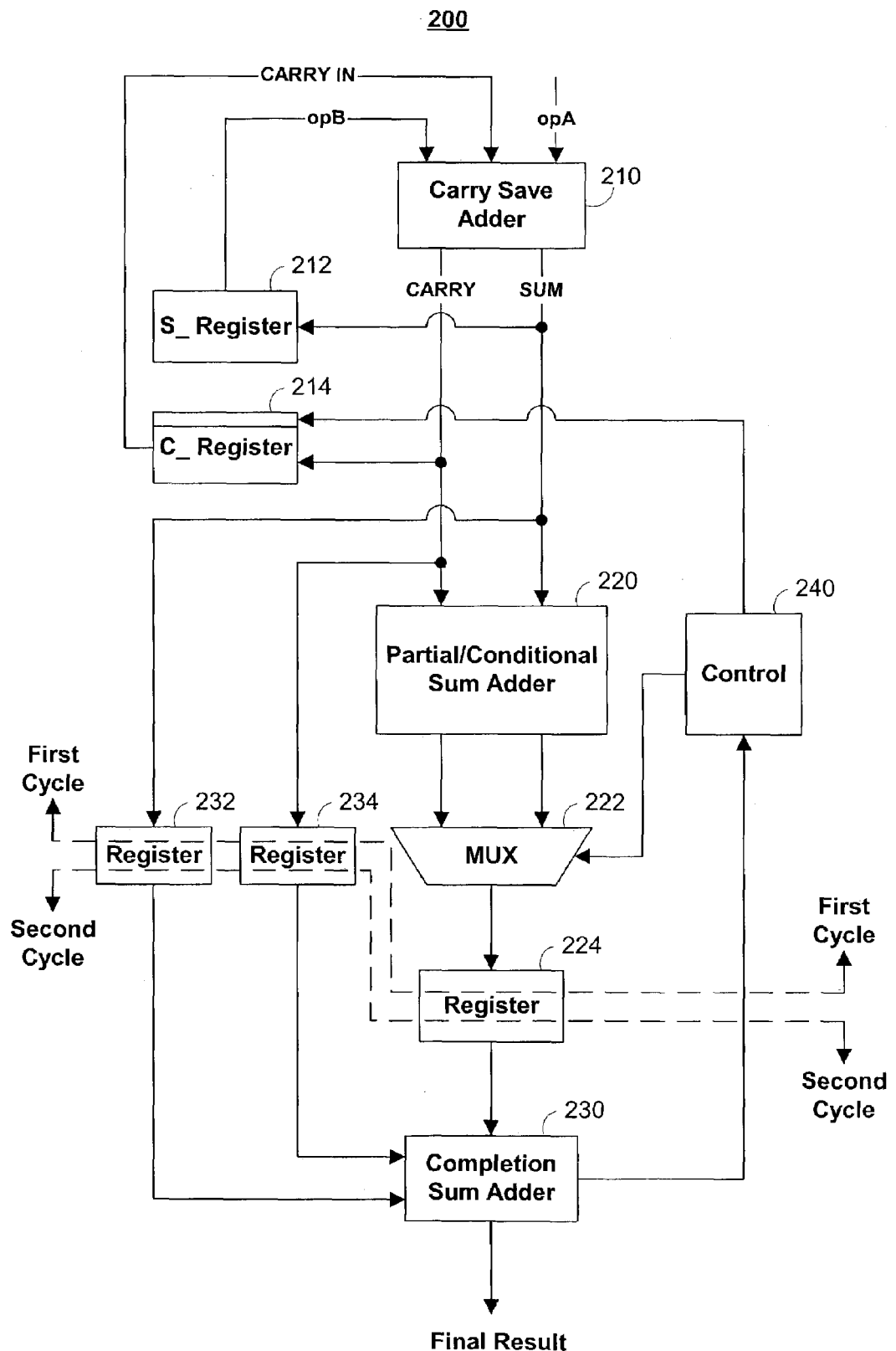
FIG. 2 is a block diagram of a portion of a hybrid ALU in accordance with the invention.

FIG. 2 shows arithmetic circuit 200 of a hybrid ALU in accordance with the invention. Arithmetic circuit 200 can be implemented in a multiple bit processor such as, for example, a 4-bit, 8-bit, 16-bit, 32-bit, 64-bit, 128-bit, or 256-bit processor.

CSA 210 has three inputs (opA, opB, and $\text{Carry}_{13}\text{IN}$) and two outputs (CARRY and SUM). Outputs CARRY and SUM are connected to partial/conditional sum adder 220 (hereinafter "P/CSA 220"). The SUM output is also connected to S_register 212, which is further connected to the opB input. Similarly, the CARRY output is connected to C_register 214, which is further connected to CSA 210 through the Carry_IN input. Routing both the SUM and CARRY outputs through S_register 212 and C_register 214, respectively, back to CSA 210 provides CSA 210 with an "effective" summation of opA, opB, and Carry_IN for the next clock cycle. CSA 210 produces a sum and carry result relatively quickly. When these sum and carry results are added together, a traditional summation (i.e., carries are propagated) of opA, opB, and Carry_IN results. The propagation of the carries is performed by P/CSA 220, completion sum adder 230, register 232, and register 234, (where adder 230 and registers 232 and 234 form execute 120 in this embodiment).

Storage of SUM and CARRY in S_register 212 and C_register 214, respectively, enables arithmetic circuit 200 to efficiently execute multiple word instructions in succession without having to stall any operations. During each clock cycle, CSA 210 can perform a carry-save addition using an input provided at opA and the SUM and CARRY results generated during the previous cycle. Thus, the feedback loop allows for a continual one operation per cycle throughput.

C_register 214 can receive a carry bit from, for example, control logic 240. The carry bit is placed in the least significant bit position of C_register 214. This can be done because the CARRY output is shifted to the left one bit, thus leaving the least significant bit position available for accepting a carry bit. A carry bit may be sent to C_register 214, for example, when executing a carry addition instruction, or when multiple word instructions are being executed.

CSA 210 generates partial SUM and CARRY results within one clock cycle because simple bitwise operations are performed, which do not need to wait for any potential carries to propagate. Registers 212 and 214 also store the partial SUM and CARRY results within one clock cycle, which enables the partial SUM and CARRY results to be used in CSA 210 in consecutive clock cycles (e.g., where a string of numbers are being added, two operands at a time).

To facilitate execution of an arithmetic operation in the portion of circuit 200 including P/CSA 220, MUX 222, register 224, completion sum adder 230, register 232, and register 234, the CARRY and SUM results are each split before being provided to P/CSA 220 and registers 232 and 234. Because this invention splits an arithmetic operation over two clock cycles (to pipeline operations), it is desirable to also split the SUM and CARRY results themselves to take advantage of the two cycle operation of the invention. By splitting the CARRY and SUM results into two portions, one portion is executed in a first clock cycle and the other portion is executed in a second clock cycle. The combined results of the separately executed portions are then combined to form the final result.

In splitting the CARRY and SUM results, a predetermined number of bits of the least significant portion of the CARRY and SUM results are provided to P/CSA 220 and a predetermined (remaining) number of bits of the most significant portion of the CARRY and SUM results are provided to registers 232 and 234, respectively. For example, if the ALU is a 4-bit ALU, the complete result can be a 5 bit number (because of the carry). Thus, if the SUM and CARRY results are stored as a 5-bit words, the two least significant bits (of SUM and CARRY) may go to P/CSA 220 and the other three bits (of SUM and CARRY) may go to registers 232 and 234, respectively.

P/CSA 220 is also commonly referred to as a conditional sum adder. P/CSA 220 calculates two partial results based on the split portions of the SUM and CARRY results. In one calculation, P/CSA 220 determines the partial result assuming that the carry-in is binary 1. In the other calculation, P/CSA 220 determines the partial result assuming that the carry-in is binary 0. Both partial calculations are provided to MUX 222. Control circuitry 240 provides a signal to MUX 222, which instructs MUX 222 to route the desired partial result to register 224.

Control circuitry 240 need not provide the carry-in signal to P/CSA 220 until the end of the first clock cycle. This is advantageous because it delays the decision for determining whether the carry-in is zero or one. For example, if a carry-out result is generated by completion sum adder 230 late in the cycle in which the carry-out result is generated, it may be too late to provide that carry-out to CSA 210 as an input in the immediately subsequent clock cycle. However, instead of attempting to provide the carry-in to the CSA 210, the carry-in can be advantageously inserted into the arithmetic operation by P/CSA 220.

After the selected P/CSA 220 result is provided to register 224, the bits contained within registers 232 and 234 and a predetermined number of the most significant bit or bits (e.g., most significant bit) contained within register 224 are summed in completion adder 230. This summation generates the higher order bits of the final result. These higher order bits are then combined (i.e., merged) with the lower order bits (the predetermined number of bits originally provided to P/CSA 220) of register 224 to form the final result.

Figure 3:
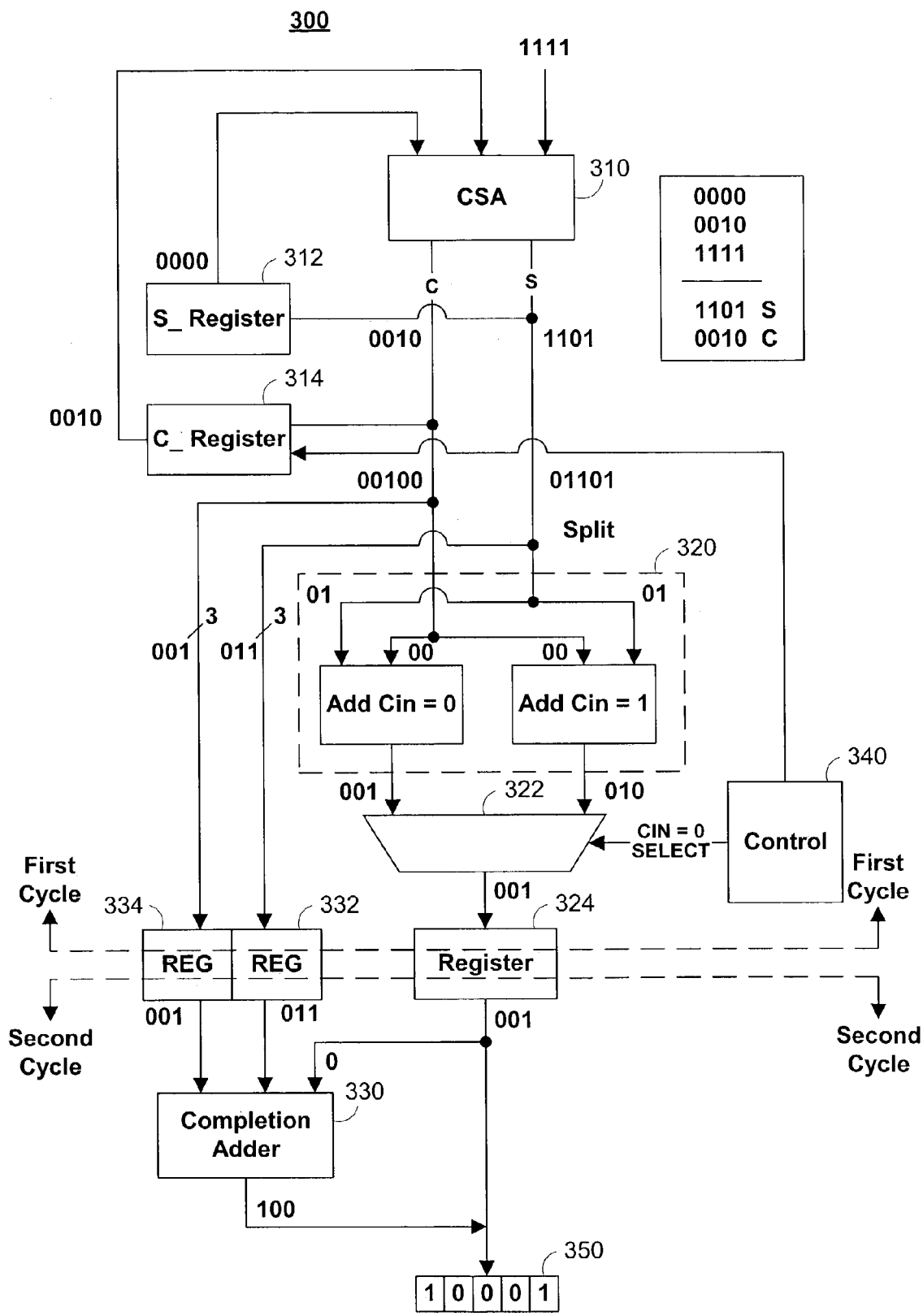
FIG. 3 is a block diagram of the hybrid ALU of FIG. 2 illustrating an addition operation.

FIG. 3 illustrates an addition operation as it progresses through arithmetic circuit 300 in accordance with the invention. Assume for this example that the hybrid ALU performs operations on 4-bit words. In this example, decimal number 2 (i.e., "0010" in binary) is added to decimal number 15 (i.e., "1111" in binary) to generate a result 17 (i.e., "10001"). Because the ALU is processing 4-bit words, a 5-bit word can be generated in the event of a carry over. Therefore, some of the busses and registers in the hybrid ALU have a width of at least 5 bits. Note that not all registers and busses require a width of 5 bits, and that registers and busses can have lower or higher width. For example, registers 324, 332, and 334 can be constructed to store 3-bit words.

In this example, the previously calculated sum of 2 is assumed to be stored in S_register 312 and C_register 314. In particular, S_register 312 has stored therein the binary number 0000 and C_register 314 has stored therein the binary number 0010. At the start of a first clock cycle, the binary words stored in S_register 312 and C_register 314 are fed back to CSA 310 as inputs. In addition, the binary number (1111) is also provided to CSA 310 as opA. The carry-save addition performed by CSA 310 generates a CARRY result of 0010 and a SUM result of 1101.

The CARRY result usually requires a left shift before it can be used in any subsequent operations. The shift moves each bit of the CARRY result to the next highest bit. This left shift creates an empty least significant bit position. If desired, control 340 can insert a carry-in bit in that least significant bit position, which is stored in C_register 314. If CARRY is shifted left prior to being stored in C_register 314, it is stored as "00100."

Because the CARRY results are shifted left one bit, the CARRY result is output on a bus having a width of 5 bits. The width of the bus has an extra bit, which enables the CARRY bit to shift left, thus leaving the least significant bit position available for receiving a carry-in bit. Prior to being transmitted to P/CSA 320, the CARRY and SUM bits may be split into two respective parts. As illustrated herein, the two least significant bits are sent to P/CSA 320 and the remaining three bits are sent to registers 332 and 334.

Once the partial SUM and CARRY results are received by P/CSA 320, P/CSA 320 performs a partial summation. As shown, the partial SUM and CARRY results are added with the carry-in being both zero and one, thus generating two partial sum results. For a carry-in of zero, a partial sum result of 001 is generated. For a carry-in of one, a partial sum result of 010 is generated. Both partial sum results are provided to MUX 322, which routes one of the partial sum results to register 324. A signal provided by control 340 selects which partial sum result is provided to register 324. For example, if the MUX select signal is zero, then the partial sum result calculated with a carry-in of zero is selected. Conversely, if the MUX select signal is one, then the partial sum result calculated with a carry-in of one is selected.

In this example, control 340 provides a carry-in of zero to MUX 322, thus the 001 partial result is provided to register 324. (Note that control 340 also provides the carry-in of zero to C_register 314. If, for example, control 340 provided a carry-in of one to MUX 322, it also would provide a carry-in of one to C_register 314.) At this point in the operation, registers 324, 332, and 334 contain the bit words 001, 011, and 001, respectively. The bit word held in register 324 is split such that the two least significant bits (e.g., 01) are provided to register 350. All other bits (e.g., 0) contained within register 324 are provided to completion adder 330 to be summed with the contents of registers 332 (e.g., 011) and 334 (e.g., 001). After completion adder 330 sums the contents of register 332, register 334, and the predetermined number of bits split off from register 324, the result (e.g., 100) is provided to register 350. The final result is formed by combining the result produced by completion adder 330 (e.g., 100) with the two least significant bits of register 324 (e.g., 01). This combination produces the final result of 10001 (i.e., decimal 17).

Persons skilled in the art will appreciate that the above example is merely exemplary, and that other operations can also be performed by arithmetic circuit 300. For example, arithmetic circuit 300 can perform subtraction, increment, decrement, etc.

Figure 4:
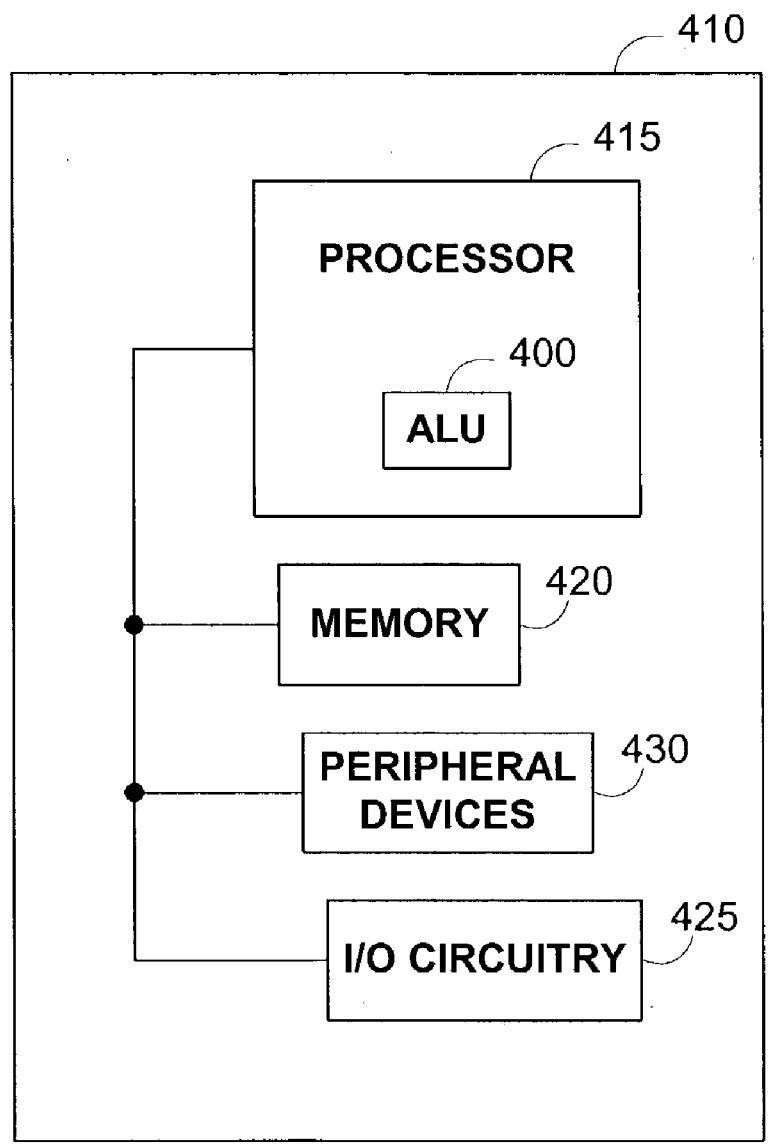
FIG. 4 is a simplified block diagram of a system employing the hybrid ALU in accordance with the invention.

FIG. 4 illustrates a hybrid ALU 400 of the invention in a system 410. System 410 can be, for example, a computer, a microcontroller, or a microprocessor. System 410 preferably includes a processor 415, memory 420, I/O circuitry 425, and peripheral devices 430. These components can be coupled together by a system bus. Moreover, these components may be populated on one or more printed circuit boards.

Processor 415 includes hybrid ALU 400. Hybrid ALU 400 processes at least a portion of an operation each clock cycle, thus substantially, if not completely, eliminating intentional stalling of ALU 400. Because hybrid ALU 400 processes at least a portion of an instruction each clock cycle, the overall speed of processor 415 is improved, which provides for a faster system 410.

Thus it is seen that an ALU is provided that performs pipelined operations while maintaining a one operation per cycle throughput to improve efficiency. Those skilled in the art will appreciate that the invention can be practiced by other than the described embodiments, which are presented for purposes of illustration rather than of limitation, and the invention is limited only by the claims which follow.

I claim:

1. An arithmetic logic unit (ALU), comprising:
   a first adder operative to receive a first and second input and operative to generate a first output and a second output;
   a first register coupled to receive and store said first output, said first register coupled to provide stored register contents to said first input;
   a second register coupled to receive and store said second output, said second register coupled to provide stored register contents to said second input;
   a second adder coupled to receive said first output and said second output, said second adder operative to generate a result based on said first and second outputs; and
   control logic coupled to said second adder and to said second register, said control logic configured to provide a carry-in bit to said second register.

2. The ALU of claim 1 wherein said first output is a bitwise summation of said first and second inputs, said bitwise summation not including any carries resulting from said bitwise summation.

3. The ALU of claim 1 wherein said second output comprises carries generated from a bitwise summation of said first and second inputs.

4. The ALU of claim 1 wherein said second adder further comprises:
   a third adder that generates a number of least significant bits of said result based on a received portion of said first output and a received portion of said second output; and
   a fourth adder that generates a number of most significant bits of said result based on the remaining portion of said first output and the remaining portion of said second output.

5. The ALU of claim 4 wherein said received portions comprise a number of least significant bits of said first and second outputs, respectively.

6. The ALU of claim 4 wherein said remaining portions comprise a number of most significant bits of said first and second outputs, respectively.

7. The ALU of claim 4 wherein said third adder generates two alterative results based on said received portions, said second adder further comprises:
   a multiplexor operative to select one of said two alternative results; and
   a register that stores said selected alternative result.

8. The ALU of claim 1 wherein said first adder is operative to receive a third input signal, said third input signal representing a carry-in signal.

9. The ALU of claim 1 wherein said first adder generates said first and second outputs in a first clock cycle and said second adder generates said final result in a second clock cycle.

10. A data processing system comprising:
    a memory; and
    a processor coupled to said memory, said processor comprising an arithmetic logic unit, said arithmetic logic unit comprising:
    a first adder that generates two output signals per clock cycle based on at least two input signals;
    at least two registers that respectively receive said output signals, said at least two registers feeding said output signals back to said first adder during a subsequent clock cycle;
    a second adder coupled to said first adder, said second adder completing an arithmetic operation partially executed by said first adder within at least one additional clock cycle; and
    control logic coupled to said second adder and to one of said at least two registers, said control logic configured to provide a carry-in bit to one of said at least two registers.

11. The system of claim 10, wherein said second adder comprises:
    a third adder coupled to said first adder; and
    a fourth adder coupled to said third adder, said fourth adder completing said arithmetic operation in a clock cycle immediately following the clock cycle in which said first adder generates two output signals.

12. A printed circuit board comprising an arithmetic logic unit mounted thereon, said arithmetic logic unit comprising:
    a first adder that generates a sum and carry per clock cycle based on at least two inputs;
    two registers that respectively receive said sum and carry, said registers feeding said sum and carry back to said first adder during a subsequent clock cycle; and
    a second adder that receives said sum and carry from said first adder, said second adder completing an arithmetic operation partially completed by said first adder in a clock cycle immediately subsequent to the clock cycle in which said sum and carry were generated, wherein said second adder generates two alternative results based on at least said sum and carry to assist in completing the arithmetic operation.

13. The printed circuit board of claim 12 further comprising a memory mounted thereon, said memory coupled to said arithmetic logic unit.

14. The printed circuit board of claim 12 further comprising a processor mounted thereon, said processor coupled to said arithmetic logic unit.

15. An arithmetic logic unit comprising:
    a first adder that generates partial results of an arithmetic operation in one clock cycle;
    feedback circuitry that provides said partial results back to said first adder for use in another operation; and
    a second adder that generates a complete result in one or more clock cycles based on said partial results, wherein said second adder generates in parallel two results based on said partial results, a first result based on said partial results and a carry-in of binary one, and a second result based on a carry-in of binary zero.

16. The arithmetic logic unit of claim 15 wherein said first adder generates said partial results based on at least three inputs.

17. The arithmetic logic unit of claim 15 wherein said first adder uses partial results from a previous clock cycle with another input to generate partial results for the current clock cycle.

18. The arithmetic logic unit of claim 15 wherein said feedback circuitry is configurable to accept a carry-in bit.

19. The arithmetic logic unit of claim 15 wherein said feedback circuitry provides to said first adder partial results obtained in a previous clock cycle from said first adder.

20. The arithmetic logic unit of claim 15 further comprising shift circuitry that shifts one of said partial results to the left one bit.

21. The arithmetic logic unit of claim 15 wherein said partial results comprise:
   a sum result representative of a bit-to-bit summation that does not include propagation of carries; and
   a carry result representative of a bit-to-bit determination of any carry generated as a result of said summation of each respective bit.

22. The arithmetic logic unit of claim 15 wherein said second adder completes said arithmetic operation initiated in said first adder.

23. The arithmetic logic unit of claim 15 further comprising:
   a multiplexor coupled to receive said first and second results; and
   control logic coupled to said multiplexor and operative to select one of said first and second results; wherein
   said second adder generates said complete result based on said partial results and said selected first or second result.

24. Apparatus for performing arithmetic operations in a computer processor, said apparatus comprising:
   means for generating first and second partial results in a same clock cycle;
   means for generating first and second alternative partial final results in the same clock cycle based on a portion of said first partial result and said second partial result;
   means for receiving said first and second alternative partial final results;
   means for selectively outputting one of said first and second alternative results; and
   means for generating a sum based on the remaining portions of said first and second partial results.

25. An arithmetic logic unit comprising:
   first adder means for receiving a first, second, and third input and for generating a first output and a second output;
   first register means for storing said first output;
   second register means for storing said second output; and
   second adder means for receiving said first and second outputs and for generating a result based on said first and second outputs, wherein said second adder generates two alternative results based on at least said first and second outputs.

* * * * *

UNITED STATES PATENT AND TRADEMARK OFFICE
CERTIFICATE OF CORRECTION

PATENT NO.        : 7,330,869 B2                                              Page 1 of 1
APPLICATION NO. : 10/406046
DATED             : February 12, 2008
INVENTOR(S)       : Jon Skull It is certified that error appears in the above-identified patent and that said Letters Patent is hereby corrected as shown below:

Column 7, line 54, insert --have-- after "would";
Column 8, line 4, change "Carry$_{13}$IN" to --Carry_IN--

Signed and Sealed this

Eighth Day of July, 2008

JON W. DUDAS
*Director of the United States Patent and Trademark Office*